United States Patent
Kim et al.

(10) Patent No.: US 10,418,188 B2
(45) Date of Patent: Sep. 17, 2019

(54) METHOD FOR MANUFACTURING LAMINATED SUPERCAPACITOR

(71) Applicant: KOREA INSTITUTE OF MACHINERY & MATERIALS, Daejeon (KR)

(72) Inventors: Jae-hyun Kim, Daejeon (KR); Seung-mo Lee, Nonsan-si (KR); Bong-kyun Jang, Daejeon (KR); In-kyu You, Gongju-si (KR); Sung-hoon Hong, Daejeon (KR); Ju-mi Kim, Daejeon (KR); Bit-na Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 16/079,746

(22) PCT Filed: Feb. 24, 2017

(86) PCT No.: PCT/KR2017/002040
§ 371 (c)(1),
(2) Date: Aug. 24, 2018

(87) PCT Pub. No.: WO2017/146513
PCT Pub. Date: Aug. 31, 2017

(65) Prior Publication Data
US 2019/0066935 A1    Feb. 28, 2019

(30) Foreign Application Priority Data
Feb. 25, 2016 (KR) .................. 10-2016-0022386

(51) Int. Cl.
*H01G 11/86* (2013.01)
*H01G 11/12* (2013.01)
(Continued)

(52) U.S. Cl.
CPC ............. *H01G 11/86* (2013.01); *H01G 11/12* (2013.01); *H01G 11/26* (2013.01); *H01G 11/32* (2013.01);
(Continued)

(58) Field of Classification Search
CPC ........ H01G 11/86; H01G 11/32; H01G 11/12; H01G 11/68; H01G 11/26; H01G 11/84; Y02E 60/13
See application file for complete search history.

(56) References Cited

U.S. PATENT DOCUMENTS

| | | | |
|---|---|---|---|
| 2007/0128472 A1 | 6/2007 | Tierney et al. | |
| 2015/0086881 A1* | 3/2015 | Zhamu ................ | H01G 11/68 429/405 |

(Continued)

FOREIGN PATENT DOCUMENTS

| | | |
|---|---|---|
| JP | 2014-523841 A | 9/2014 |
| KR | 10-2001-0082058 A | 8/2001 |

(Continued)

OTHER PUBLICATIONS

Wu et al. ("A high-performance current collector-free flexible in-plane micro-supercapacitor based on a highly conductive reduced graphene oxide film," J Mater. Chem. A, 4, pp. 16213-16218, 2016) (Year: 2016).*

(Continued)

*Primary Examiner* — Yasser A Abdelaziez
(74) *Attorney, Agent, or Firm* — Hauptman Ham, LLP (57) ABSTRACT

In a method for manufacturing a supercapacitor, a first graphene current collector, a first electrode and a first separating layer are sequentially formed on a first metal layer, to form a first stacked layer. A second graphene current collector and a second electrode are sequentially formed on a second metal layer, to form a second stacked layer. The second electrode of the second stacked layer is formed on the first separating layer of the first stacked layer, to form a third stacked layer. The third stacked layer is compressed to remove the first and second metal layers, to form a unit stacked layer. The unit stacked layer and a second separating layer or an insulating layer are alternately formed.

6 Claims, 5 Drawing Sheets

(51) Int. Cl.
*H01G 11/26* (2013.01)
*H01G 11/68* (2013.01)
*H01G 11/84* (2013.01)
*H01G 11/32* (2013.01)

(52) U.S. Cl.
CPC .............. *H01G 11/68* (2013.01); *H01G 11/84* (2013.01); *Y02E 60/13* (2013.01)

(56) References Cited

U.S. PATENT DOCUMENTS

2015/0325885 A1* 11/2015 Nansaka ................ H01G 11/26
429/94
2017/0200570 A1* 7/2017 Ciocanel ................ H01G 11/86

FOREIGN PATENT DOCUMENTS

| KR | 10-2013-0069035 A | 6/2013 |
| KR | 10-2014-0103087 A | 8/2014 |
| KR | 10-2015-0049279 A | 5/2015 |

OTHER PUBLICATIONS

International Search Report dated Apr. 28, 2017, issued in corresponding International Application No. PCT/KR2017/002040.

* cited by examiner

METHOD FOR MANUFACTURING LAMINATED SUPERCAPACITOR

CROSS REFERENCE TO RELATED APPLICATIONS

This present application is a national stage filing under 35 U.S.C § 371 of PCT application number PCT/KR2017/002040 filed on Feb. 24, 2017 which is based upon and claims the benefit of priority to Korean Patent Application No. 10-2016-0022386 filed on Feb. 25, 2016 in the Korean Intellectual Property Office. The disclosures of the above-listed applications are hereby incorporated by reference herein in their entirety.

BACKGROUND

1. Field of Disclosure

The present disclosure of invention relates to a method for manufacturing a multi-layer supercapacitor, and more specifically the present disclosure of invention relates to a method for manufacturing a multi-layer supercapacitor capable of enhancing capacity for unit volume.

2. Description of Related Technology

Supercapacitor is a capacitor having relatively large capacity, and is called as ultra-capacitor or electrochemical capacitor. The supercapacitor stores relatively large energy and outputs high energy within tens of seconds or several minutes, and is an effective element satisfying the energy and the output which could not be stored in the conventional condenser or secondary battery. The supercapacitor is divided into pseudo capacitor with redox reaction and electric double layer capacitor (EDLC) without redox reaction.

The supercapacitor is used as a backup power and a high output sub power in home appliances like a mobile terminal, an audio, a video, a camera, and so on, and may be used as the high output sub power in an uninterruptible power supply (UPS), a transport machine like a hybrid car (HEV) or a fuel cell electric vehicle (FCEV), and a smart grid. Due to relatively high life span and high output, the supercapacitor is developed to be used for acceleration or start power of a vehicle.

To manufacture the supercapacitor having relatively small thickness and high capacity, the capacity stored at a unit volume (or a unit weight) should be maximized. Conventionally, a metal layer having aluminum or copper is used in the supercapacitor as disclosed by Japanese laid-open patent application No. 2014-523841. However, the capacity for the unit volume (or the unit weight) is decreased due to a volume and a high density of the metal layer. Recently, the supercapacitor having relatively high energy density for the unit volume is required in fields of a wearable electric device and a drone.

Thus, a current collector having relatively high current collecting efficiency and a relatively small thickness, and the supercapacitor having the current collector, are necessary to be developed.

The related prior art is Japanese laid-open patent application No. 2014-523841.

SUMMARY

The present invention is developed to solve the above-mentioned problems of the related arts. The present invention provides a method for manufacturing a multi-layer supercapacitor capable of enhancing capacity for unit volume.

According to an example embodiment of a method for manufacturing a supercapacitor, a first graphene current collector, a first electrode and a first separating layer are sequentially formed on a first metal layer, to form a first stacked layer. A second graphene current collector and a second electrode are sequentially formed on a second metal layer, to form a second stacked layer. The second electrode of the second stacked layer is formed on the first separating layer of the first stacked layer, to form a third stacked layer. The third stacked layer is compressed to remove the first and second metal layers, to form a unit stacked layer. The unit stacked layer and a second separating layer or an insulating layer are alternately formed.

According to another example embodiment of a method for manufacturing a supercapacitor, a first graphene current collector, a first electrode and a first separating layer are sequentially formed on a first metal layer, to form a first stacked layer. The first stacked layer is compressed to remove the first metal layer, to form a 1-1 unit stacked layer. The 1-1 unit stacked layer and a second separating layer or an insulating layer are alternately formed.

According to the present example embodiments, graphene is used as a current collector, so that a thickness of the current collector is decreased. Thus, the capacity for a unit volume may be enhanced.

In addition, unnecessary metal layer in the supercapacitor is removed easily via compressing and heat treatment, and thus the supercapacitor may be manufactured more easily.

In addition, a graphene current collector similar to the electrode having carbon-based material is used, and thus interfacial adhesion between the electrode and the current collector is increased to increase cycle life span of charging and discharging and reliability.

| * Reference numerals | |
|---|---|
| 1: supercapacitor | 10: first stacked layer |
| 20: second stacked layer | 30: unit stacked layer |
| 40: insulating layer (second separating layer) | 101, 102: first and second metal layers |
| 201, 202: first and second graphene current collectors | 301, 302: first and second electrodes |
| 400: first separating layer | |

DETAILED DESCRIPTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Same elements or components are expressed with same reference numerals in the drawings.

The terminology used herein is for the purpose of describing particular embodiments only and is not intended to be limiting of the invention. In addition, the same reference numerals will be used to refer to the same or like parts and any further repetitive explanation concerning the above elements will be omitted. Detailed explanation regarding prior arts will be omitted not to increase uncertainty of the present example embodiments of the present invention.

When a metal layer is used as a current collector, a thickness of the metal layer is too thick so that the capacity for a unit volume is too low. However, the thickness of the metal layer is to be thin, and then the supercapacitor may be damaged more easily when the supercapacitor is carried or is assembled.

Thus, in the present example embodiment, the supercapacitor having the current collector having the thickness thinner than the metal layer, and thus the capacity for the unit volume (or for a unit weight) may be increased.

Referring to FIGS. 1A to 1F, in the method for manufacturing the supercapacitor according to the example embodiment, a) a first graphene current collector 201, a first electrode 301 and a first separating layer 400 are sequentially formed on a first metal layer 101, to form a first stacked layer 10. b) A second graphene current collector 202 and a second electrode 302 are sequentially formed on a second metal layer 102, to form a second stacked layer 20. c) The second electrode of the second stacked layer is formed on the first separating layer of the first stacked layer, to form a third stacked layer. d) The third stacked layer is compressed to remove the first and second metal layers, to form a unit stacked layer 30. e) The unit stacked layer and a second separating layer or an insulating layer are alternately formed. Here, step a) and step b) may be performed without order.

Figure 1A:
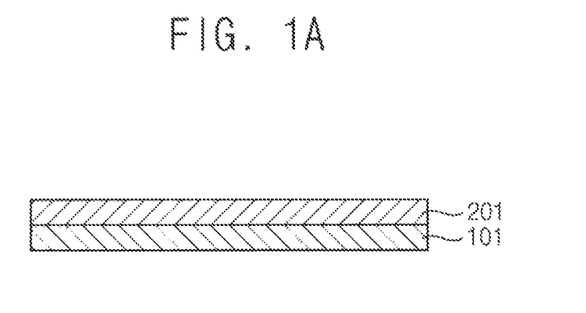
FIGS. 1A, 1B, 1C, 1D, 1E and 1F are cross-sectional views illustrating a method for manufacturing a supercapacitor according to an example embodiment of the present invention.
Figure 1B:
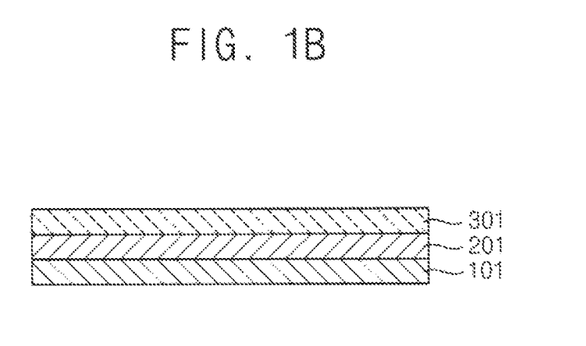

Here, each of thickness of the first and second graphene current collectors 201 and 202 is between about 0.4 nm and about 1 μm. Thus, the thickness thereof is thinner than the conventional metal current collector of more than 30 μm, and thus the capacity for the unit volume of the supercapacitor may be increased due to the decrease of the volume of the current collector for unit volume of the supercapacitor. In addition, since a density of the graphene is much lower than that of the metal, the weight may be decreased by a quantity of (decreasing rate of volume*rate of density). The first and second graphene current collectors are independently stacked via chemical vapor deposition, to satisfy the above mentioned range of thickness and uniform thickness, and thus the current collectors may be formed uniformly and relatively thinly.

More detailed explanation will be followed.

First, a) the first graphene current collector 201, the first electrode 301 and the first separating layer 400 are sequentially formed on the first metal layer 101, to form the first stacked layer 10.

Here, step a) includes, a-1) the first graphene current collector 201 is formed on the first metal layer 101, a-2) the first electrode 301 is formed on the first graphene current collector 201, and a-3) the first separating layer 400 is formed on the first electrode 301.

In step a-1), the first graphene current collector 201 may be formed on the first metal layer 101, via the chemical vapor deposition (CVD), and thus the current collector 201 may be formed more uniformly and more thinly.

Here, in the chemical vapor deposition, the conventional CVD may be applied, and for example, a mixed gas including a carbon source gas, an inert gas and a reducing gas is injected into a chamber to synthesize the graphene. Here, the carbon source gas may be saturated or unsaturated hydrocarbon having carbon number of 1~4, and may be ethylene, acetylene, methane, propane and so on, but not limited thereto. The inert gas may be argon (Ar), neon (Ne), helium (He), nitrogen ($N_2$) and so on. The reducing gas may be hydrogen ($H_2$), ammonia ($NH_3$), and so on. In addition, the inert gas of 5~15 sccm and the reducing gas of 10~30 sccm may be injected with respect to the carbon source gas of 1 sccm. Here, the amount of the mixed gas may be properly selected based on a volume of furnace used for the CVD and the thickness of the graphene current collector.

Temperature of the chamber may be properly selected to synthesize the graphene uniformly, and thus not limited. For example, the temperature may be between about 800° C. and about 1200° C., and may be between about 950° C. and about 1020° C. for copper or nickel metal layer. Further optimized process may be performed additionally, to find the optimized temperature and time for the synthesis of the graphene in the CVD, based on the kinds of the metal layer and the thickness of the graphene current collector.

The time for the synthesis in the present example embodiment, may be changed based on the thickness of the graphene current collector, the temperature, the amount of the mixed gas, and so on, but the synthesis is performed until the graphene is synthesized with a continuous thin layer shape in the first metal layer, for example, about 30 mins to 2 hours, but not limited thereto.

The thickness of the first graphene current collector synthesized via the above-mentioned method may be between about 0.4 nm and about 1 μm. Thus, the current collector may have a proper function and may be efficient to increase the capacity for the unit volume. When the graphene current collector having the more increased thickness, bending stiffness of the graphene current collector is increased to cause the damage thereof in the removing process, and advantages may be decreased.

The first metal layer is used as a catalyst for growing the graphene, and the conventional metal may be used as the first metal layer, such as nickel (Ni), copper (Cu), ruthenium (Ru), iridium (Ir), platinum (Pr), cobalt (Co), rhodium (Rh), silver (Ag) and an alloy thereof. Nickel has relatively large carbon solubility to be profit to synthesize the graphene, and copper and the platinum are profit to synthesize the graphene having relatively thin thickness.

Then, after the first graphene current collector is formed on the first metal layer, a-2) the first electrode 301 is formed on the first graphene current collector 201.

The first electrode 301 according to the present example embodiment may be formed via coating a conventional electrode material on the first graphene current collector 201. For example, the first electrode 301 may be formed via coating a first slurry having a first carbon material, a first conductive material and a first binder on the first graphene current collector 201 and drying the first slurry. Here, the first carbon material is not limited, and may be at least one selected among an activated carbon, a graphene, a reduced graphene oxide (r-GO), a carbon nanofiber and a carbon nanotube.

The first conductive material is not limited, and may be at least one selected among a carbon blacks such as a super-P carbon black, an acetylene black, a ketjen black, a channel black, a fernice black, a lamp black and a summer black, a metal powder such as a copper powder, a silicon powder and a zinc powder, a metal oxide such as titan oxide, and a conductive carbon material such as graphene, a carbon fiber and a polyphenylene derivative.

The first binder is also not limited, and may be at least one selected among polyvinylidenefluoride (PVdF), polyvinyl alcohol (PVA), polyvinylpyrrolidone (PVP), carboxymethyl cellulose (CMC), ethyl cellulose, acrylic resin, styrene-butadiene rubber and polytetrafluoroethylene.

In the first slurry, a mixed ratio of the first carbon material, the first conductive material and the first binder, is not limited. For example, for the first carbon material of 100 part by weight, the first conductive material of 10~25 part by weight, and the first binder of 5~20 part by weight may be mixed, and additional processes may be necessary for the proper mixed ratio thereof. A solution may be added to the slurry to increase the mix ability and to control viscosity, and the added solution may be removed via a heat treatment.

A method for coating the first slurry is not limited, and may be one of a spin coating, a bar coating, a blade coating, a roll to roll coating, a comma coating, a die coating, a gravure coating and a micro gravure coating.

Then, after the first electrode is formed on the first graphene current collector, a-3) the first separating layer 400 is formed on the first electrode 301.

The first separating layer prevents positive and negative nodes from being electrically connected, and an ion passes through the first separating layer. The first separating layer is not limited for performing the above function, and may be a porous layer manufactured by a polymer selected from at least one of polyethylene, polypropylene, polyvinylidenfluoride, polyvinylidenchloride, polyacrylonitrile, polyacrylamide, polytetrafluoro ethylene, polysulfone, polyethersulfone, polycarbonate, polyamide, polyimide, polyethylene oxide, polypropylene oxide, cellulose type polymer, polyacryl type polymer and so on. A conventional method for forming the first separating layer may be used.

In addition, all methods except for forming the first separating layer 400 of step a), may be performed for step b). Here, step a) and step b) may be performed independently without an order.

Step b) includes b-1) the second graphene current collector 202 is formed on the second metal layer 102, and b-2) the second electrode 302 is formed on the second graphene current collector 202.

As an example for step b-1), the second graphene current collector 202 is formed on the second metal layer 102 via the chemical vaper deposition (CVD), and thus the second graphene current collector 202 may be formed to have relatively thinner and uniform thickness.

Here, in the chemical vapor deposition, the conventional CVD may be applied, and for example, a mixed gas including a carbon source gas, an inert gas and a reducing gas is injected into a chamber to synthesize the graphene. Here, the carbon source gas may be saturated or unsaturated hydrocarbon having carbon number of 1~4, and may be ethylene, acetylene, methane, propane and so on, but not limited thereto. The inert gas may be argon (Ar), neon (Ne), helium (He), nitrogen ($N_2$) and so on. The reducing gas may be hydrogen ($H_2$), ammonia ($NH_3$), and so on. In addition, the inert gas of 5~15 sccm and the reducing gas of 10~30 sccm may be injected with respect to the carbon source gas of 1 sccm. Here, the amount of the mixed gas may be properly selected based on a volume of furnace used for the CVD and the thickness of the graphene current collector.

Temperature of the chamber may be properly selected to synthesize the graphene uniformly, and thus not limited. For example, the temperature may be between about 800° C. and about 1200° C., and may be between about 950° C. and about 1020° C. for copper or nickel metal layer. Further optimized process may be performed additionally, to find the optimized temperature and time for the synthesis of the graphene in the CVD, based on the kinds of the metal layer and the thickness of the graphene current collector.

The time for the synthesis in the present example embodiment, may be changed based on the thickness of the graphene current collector, the temperature, the amount of the mixed gas, and so on, but the synthesis is performed until the graphene is synthesized with a continuous thin layer shape in the second metal layer, for example, about 30 mins to 2 hours, but not limited thereto.

The thickness of the second graphene current collector synthesized via the above-mentioned method may be between about 0.4 nm and about 1 μm. Thus, the current collector may have a proper function and may be efficient to increase the capacity for the unit volume. When the graphene current collector having the more increased thickness, bending stiffness of the graphene current collector is increased to cause the damage thereof in the removing process, and advantages may be decreased.

The second metal layer is used as a catalyst for growing the graphene, and the conventional metal may be used as the first metal layer, such as nickel (Ni), copper (Cu), ruthenium (Ru), iridium (Ir), platinum (Pr), cobalt (Co), rhodium (Rh), silver (Ag) and an alloy thereof. Nickel has relatively large carbon solubility to be profit to synthesize the graphene, and copper and the platinum are profit to synthesize the graphene having relatively thin thickness. Here, the second metal layer may include the metal different from or the same as that of the first metal layer.

Then, after the second graphene current collector is formed on the second metal layer, b-2) the second electrode 302 is formed on the second graphene current collector 202.

The second electrode 302 according to the present example embodiment may be formed via coating a conventional electrode material on the second graphene current collector 202. For example, the second electrode 302 may be formed via coating a second slurry having a second carbon material, a second conductive material and a second binder on the second graphene current collector 202 and drying the second slurry. Here, the second carbon material is not limited, and may be at least one selected among an activated carbon, a graphene, a reduced graphene oxide (r-GO), a carbon nanofiber and a carbon nanotube.

The second conductive material is not limited, and may be at least one selected among a carbon blacks such as a super-P carbon black, an acetylene black, a ketjen black, a channel black, a fernice black, a lamp black and a summer black, a metal powder such as a copper powder, a silicon powder and a zinc powder, a metal oxide such as titan oxide, and a conductive carbon material such as graphene, a carbon fiber and a polyphenylene derivative.

The second binder is also not limited, and may be at least one selected among polyvinylidenefluoride (PVdF), polyvinyl alcohol (PVA), polyvinylpyrrolidone (PVP), carboxymethyl cellulose (CMC), ethyl cellulose, acrylic resin, styrene-butadiene rubber and polytetrafluoroethylene. Here, each of the second carbon material, the second conductive material and the second binder may be different from or the same as each of the first carbon material, the first conductive material and the first binder.

In the second slurry, a mixed ratio of the second carbon material, the second conductive material and the second binder, is not limited. For example, for the second carbon material of 100 part by weight, the second conductive material of 10~25 part by weight, and the second binder of 5~20 part by weight may be mixed, and additional processes may be necessary for the proper mixed ratio thereof. A solution may be added to the slurry to increase the mix ability and to control viscosity, and the added solution may be removed via a heat treatment.

A method for coating the second slurry is not limited, and may be one of a spin coating, a bar coating, a blade coating, a roll to roll coating, a comma coating, a die coating, a gravure coating and a micro gravure coating. The method for coating the second slurry may be different from or the same as that for coating the first slurry.

Figure 1C:
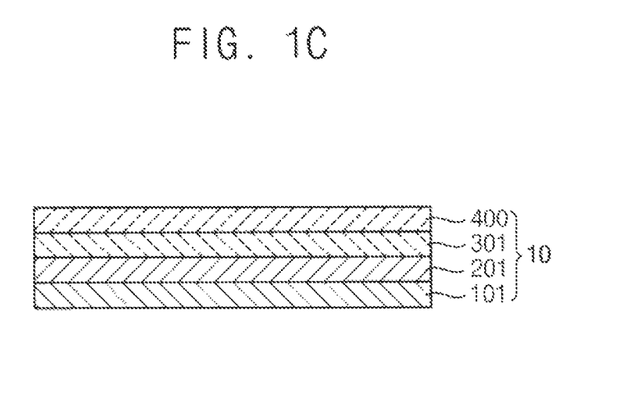

Then, after the first stacked layer 10 and the second stacked layer 20 are manufactured, c) the second electrode 302 of the second stacked layer 20 is formed on the first separating layer 400 of the first stacked layer 10, to form a third stacked layer.

Figure 1D:
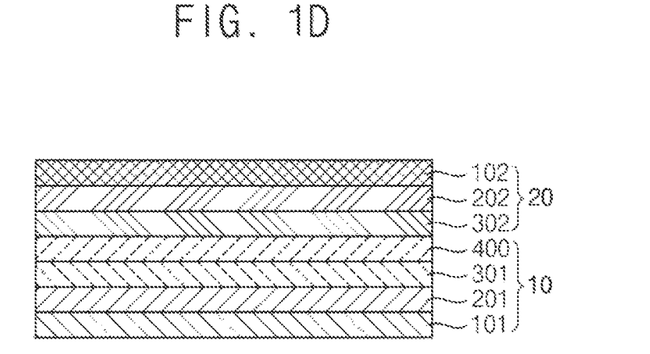

After forming the third stacked layer, d) the third stacked layer is compressed to remove the first and second metal layers 101 and 102, to form a unit stacked layer 30. Accordingly, using the simple compressing process, the metal layer unnecessary to the supercapacitor may be easily removed, and then the supercapacitor may be easily manufactured.

Here, the heat treatment may be performed before the compressing or simultaneously with the compressing. The heat treatment removes the solution used to form the first slurry or the second slurry, and the temperature for the heat treatment may be different based on the solution, and may be between about 100° C. and about 250° C. The time for the heat treatment may be enough for removing the solution, and may be more than 2 hours.

Accordingly, the compressing increases the adhesion between the graphene current collector and the electrode via attaching the graphene to the electrode closely, and may be performed in an ordinary temperature or a relatively high temperature (when the heat treatment is performed at the same time).

For example, the compressing in step d), may be performed via a roll pressing process, to satisfy Equation 1.

$$T_0 \times 0.3 \leq T \leq T_0 \times 0.5 \quad \text{[Equation 1]}$$

Here, $T_0$ is a thickness [μm] of the third stacked layer before the compressing, and T is a thickness [μm] of the third stacked layer after the compressing and before the removing of the first and second metal layers.

In the roll pressing process, the third stacked layer is inserted between two rollers and a mechanical pressure is applied to the third stacked layer. The process conditions may be sufficient for satisfying Equation 1, and may be optimized based on the materials used for the electrode. Accordingly, the adhesion between the first graphene current collector and the first electrode, is more increased than that between the first graphene current collector and the first metal layer, and the adhesion between the second graphene current collector and the second electrode, is more increased than that between the second graphene current collector and the second metal layer, and thus the first and second metal layers may be detached more easily. After the graphene is synthesized on the metal layer via the CVD, very weak van der Waals force is applied between the metal layer and the graphene, and thus the metal layer may be easily remove or detached from the electrode and the current collector after the compressing. Alternatively, the electrode and the current collector are partially fixed and are peeled such that the metal layer may be easily detached from the graphene current collector, when the removing or the detaching is not easily performed.

After the compressing of step d), the adhesion force between the first graphene current collector and the first electrode, and the adhesion force between the second graphene current collector and the second electrode, may be respectively, between about 10 J/m² to about 200 J/m². Since the adhesion force between the graphene current collector and the metal is known as about 0.7 J/m², the adhesion force mentioned above is enough for the metal layer to be easily removed from the electrode and the current collector. In addition, the adhesion force is high enough for the supercapacitor to have relatively high mechanical properties in the manufacturing, and thus the supercapacitor may have an increased life span and reliability.

Accordingly, the supercapacitor may be manufactured via the manufactured unit stacked layer.

Figure 1E:
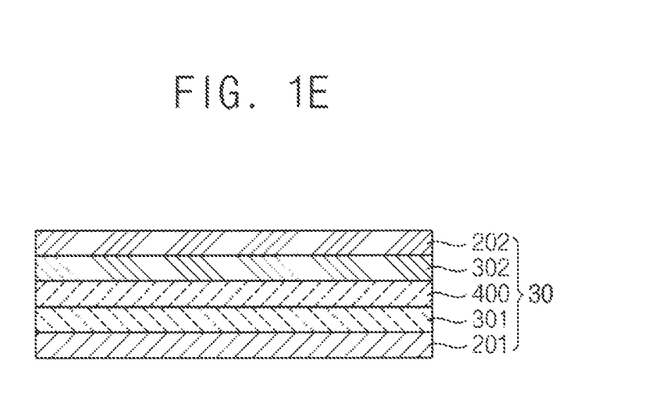
Figure 1F:
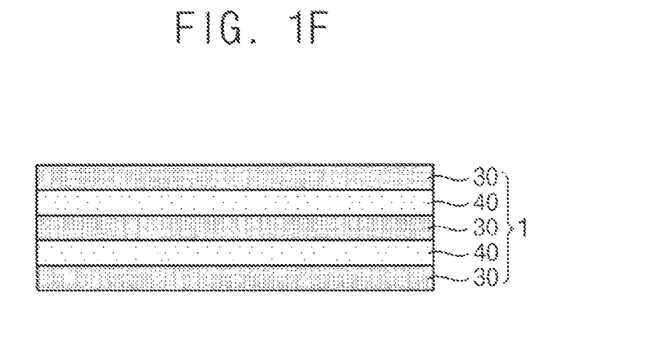

Here, e) the unit stacked layer 30 and a second separating layer 40 (or an insulating layer) are alternately formed.

Figure 2A:
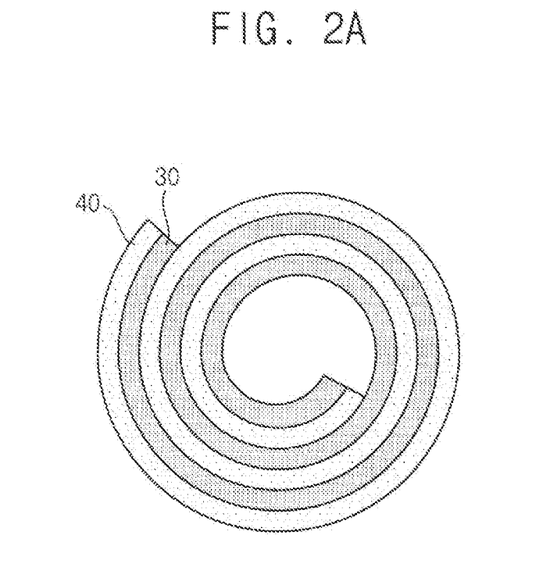
FIGS. 2A, 2B and 2C are schematic diagrams illustrating the supercapacitor manufactured by the method above, and respectively a jelly roll shape, a wrinkle shape and a folded shape.
Figure 2B:
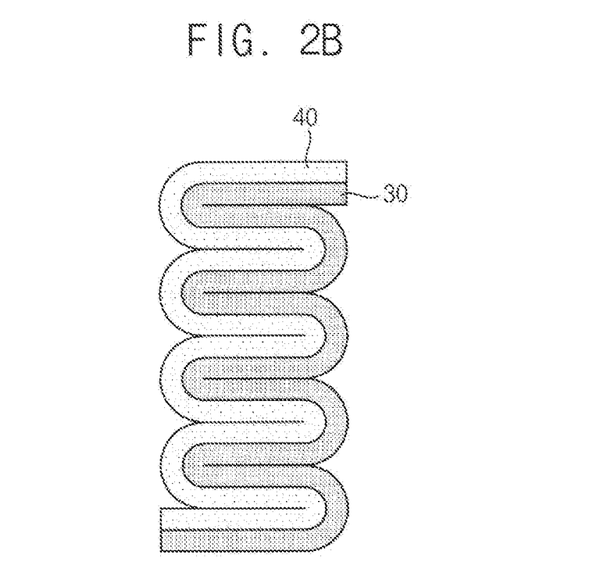
Figure 2C:
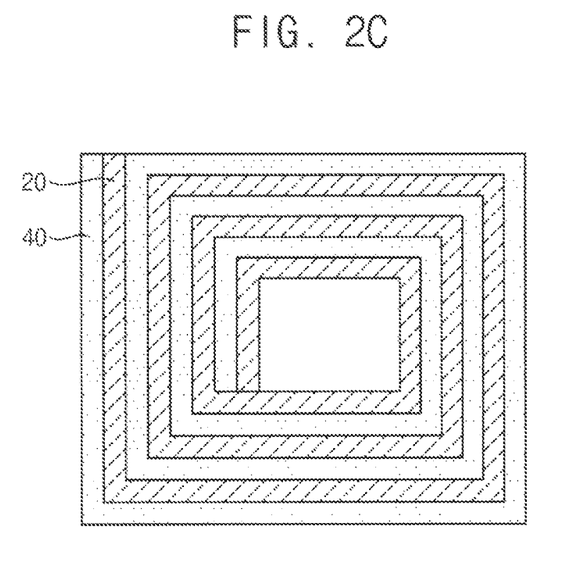

For example, the unit stacked layer 30 and the second separating layer 40 are alternately formed with each other one by one, or the unit stacked layer 30 and the insulting layer are alternately formed with each other one by one. Alternatively, the unit stacked layer 30 and the second separating layer are stacked, or the unit stacked layer 30 and the insulating layer are stacked, and then, as illustrated in FIGS. 2A to 2C, the stacked layers are rolled like a jelly roll shape in FIG. 2A, or are folded like a wrinkle shape or a folded shape in FIGS. 2B and 2C.

The number of the stacked layers of the unit stacked layer in the supercapacitor may be decided based on the thickness required for the supercapacitor or the thickness of the current collector, the electrode and the separating layer. Further, series or parallel connections due to a voltage and a capacitor for the supercapacitor may be considered. Accordingly, the supercapacitor having relatively thinner thickness and higher capacitor may be manufactured.

Figure 3A:
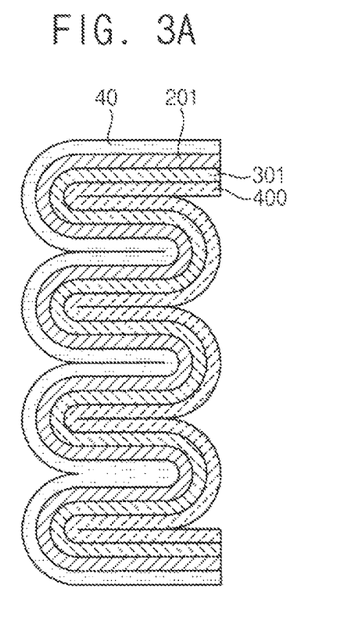
FIGS. 3A and 3B are schematic diagrams illustrating the supercapacitor manufactured by a method according to another example embodiment of the present invention, and respectively a wrinkle shape and an angled wrinkle shape.
Figure 3B:
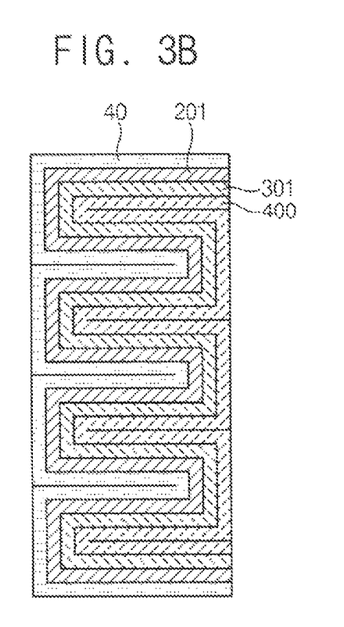

In a method for manufacturing a supercapacitor according to another example embodiment, the method includes A) sequentially forming a first graphene current collector 201, a first electrode 301 and a first separating layer 400 on a first metal layer 101, to form a first stacked layer 10; B) compressing the first stacked layer 10 to remove the first metal layer 101, to form a 1-1 unit stacked layer; and C) alternately forming the 1-1 unit stacked layer and a second separating layer 40 or an insulating layer.

Here, step A) is substantially same as step a).

In the method, firstly, A) the first graphene current collector 201, the first electrode 301 and the first separating layer 400 are formed on the first metal layer 101, to form the first stacked layer 10.

Here, step A) includes, A-1) the first graphene current collector 201 is formed on the first metal layer 101, A-2) the first electrode 301 is formed on the first graphene current collector 201, and A-3) the first separating layer 400 is formed on the first electrode 301.

In step a-1), the first graphene current collector 201 may be formed on the first metal layer 101, via the chemical vapor deposition (CVD), and thus the current collector 201 may be formed more uniformly and more thinly.

Here, in the chemical vapor deposition, the conventional CVD may be applied, and for example, a mixed gas including a carbon source gas, an inert gas and a reducing gas is injected into a chamber to synthesize the graphene. Here, the carbon source gas may be saturated or unsaturated hydrocarbon having carbon number of 1~4, and may be ethylene, acetylene, methane, propane and so on, but not limited thereto. The inert gas may be argon (Ar), neon (Ne), helium (He), nitrogen ($N_2$) and so on. The reducing gas may be hydrogen ($H_2$), ammonia ($NH_3$), and so on. In addition, the inert gas of 5~15 sccm and the reducing gas of 10~30 sccm may be injected with respect to the carbon source gas of 1 sccm. Here, the amount of the mixed gas may be properly selected based on a volume of furnace used for the CVD and the thickness of the graphene current collector.

Temperature of the chamber may be properly selected to synthesize the graphene uniformly, and thus not limited. For example, the temperature may be between about 800° C. and about 1200° C., and may be between about 950° C. and about 1020° C. for copper or nickel metal layer. Further optimized process may be performed additionally, to find the optimized temperature and time for the synthesis of the graphene in the CVD, based on the kinds of the metal layer and the thickness of the graphene current collector.

The time for the synthesis in the present example embodiment, may be changed based on the thickness of the graphene current collector, the temperature, the amount of the mixed gas, and so on, but the synthesis is performed until the graphene is synthesized with a continuous thin layer shape in the first metal layer, for example, about 30 mins to 2 hours, but not limited thereto.

The thickness of the first graphene current collector synthesized via the above-mentioned method may be between about 0.4 nm and about 1 μm. Thus, the current collector may have a proper function and may be efficient to increase the capacity for the unit volume. When the graphene current collector having the more increased thickness, bending stiffness of the graphene current collector is increased to cause the damage thereof in the removing process, and advantages may be decreased.

The first metal layer is used as a catalyst for growing the graphene, and the conventional metal may be used as the first metal layer, such as nickel (Ni), copper (Cu), ruthenium (Ru), iridium (Ir), platinum (Pr), cobalt (Co), rhodium (Rh), silver (Ag) and an alloy thereof. Nickel has relatively large carbon solubility to be profit to synthesize the graphene, and copper and the platinum are profit to synthesize the graphene having relatively thin thickness.

Then, after the first graphene current collector is formed on the first metal layer, A-2) the first electrode 301 is formed on the first graphene current collector 201.

The first electrode 301 according to the present example embodiment may be formed via coating a conventional electrode material on the first graphene current collector 201. For example, the first electrode 301 may be formed via coating a first slurry having a first carbon material, a first conductive material and a first binder on the first graphene current collector 201 and drying the first slurry. Here, the first carbon material is not limited, and may be at least one selected among an activated carbon, a graphene, a reduced graphene oxide (r-GO), a carbon nanofiber and a carbon nanotube.

The first conductive material is not limited, and may be at least one selected among a carbon blacks such as a super-P carbon black, an acetylene black, a ketjen black, a channel black, a fernice black, a lamp black and a summer black, a metal powder such as a copper powder, a silicon powder and a zinc powder, a metal oxide such as titan oxide, and a conductive carbon material such as graphene, a carbon fiber and a polyphenylene derivative.

The first binder is also not limited, and may be at least one selected among polyvinylidenefluoride (PVdF), polyvinyl alcohol (PVA), polyvinylpyrrolidone (PVP), carboxymethyl cellulose (CMC), ethyl cellulose, acrylic resin, styrene-butadiene rubber and polytetrafluoroethylene.

In the first slurry, a mixed ratio of the first carbon material, the first conductive material and the first binder, is not limited. For example, for the first carbon material of 100 part by weight, the first conductive material of 10~25 part by weight, and the first binder of 5~20 part by weight may be mixed, and additional processes may be necessary for the proper mixed ratio thereof. A solution may be added to the slurry to increase the mix ability and to control viscosity, and the added solution may be removed via a heat treatment.

A method for coating the first slurry is not limited, and may be one of a spin coating, a bar coating, a blade coating, a roll to roll coating, a comma coating, a die coating, a gravure coating and a micro gravure coating.

Then, after the first electrode is formed on the first graphene current collector, A-3) the first separating layer 400 is formed on the first electrode 301.

The first separating layer prevents positive and negative nodes from being electrically connected, and an ion passes through the first separating layer. The first separating layer is not limited for performing the above function, and may be a porous layer manufactured by a polymer selected from at least one of polyethylene, polypropylene, polyvinylidenfluoride, polyvinylidenchloride, polyacrylonitrile, polyacrylamide, polytetrafluoro ethylene, polysulfone, polyethersulfone, polycarbonate, polyamide, polyimide, polyethylene oxide, polypropylene oxide, cellulose type polymer, polyacryl type polymer and so on. A conventional method for forming the first separating layer may be used.

Then, B) the first stacked layer 10 is compressed to remove the first metal layer 101, to form a 1-1 unit stacked layer. Accordingly, using the simple compressing process, the metal layer unnecessary to the supercapacitor may be easily removed, and then the supercapacitor may be easily manufactured.

Here, the heat treatment may be performed before the compressing or simultaneously with the compressing. The heat treatment removes the solution used to form the first slurry or the second slurry, and the temperature for the heat treatment may be different based on the solution, and may be between about 100° C. and about 250° C. The time for the heat treatment may be enough for removing the solution, and may be more than 2 hours.

Accordingly, the compressing increases the adhesion between the graphene current collector and the electrode via attaching the graphene to the electrode closely, and may be performed in an ordinary temperature or a relatively high temperature (when the heat treatment is performed at the same time).

For example, the compressing in step B), may be performed via a roll pressing process, to satisfy Equation 1.

$$T_B \times 0.3 \le T_A \le T_B \times 0.5 \qquad \text{[Equation 2]}$$

Here, $T_B$ is a thickness [μm] of the first stacked layer before the compressing, and $T_A$ is a thickness [μm] of the first stacked layer after the compressing and before the removing of the first metal layer.

In the roll pressing process, the first stacked layer is inserted between two rollers and a mechanical pressure is applied to the third stacked layer. The process conditions may be sufficient for satisfying Equation 2, and may be optimized based on the materials used for the electrode. Accordingly, the adhesion between the first graphene current collector and the first electrode, is more increased than that between the first graphene current collector and the first metal layer, and thus the first metal layer may be detached more easily. After the graphene is synthesized on the metal layer via the CVD, very weak van der Waals force is applied between the metal layer and the graphene, and thus the metal layer may be easily remove or detached from the electrode and the current collector after the compressing. Alternatively, the electrode and the current collector are partially fixed and are peeled such that the metal layer may be easily detached from the graphene current collector, when the removing or the detaching is not easily performed.

After the compressing of step B), the adhesion force between the first graphene current collector and the first electrode, may be between about 10 $J/m^2$ to about 200 $J/m^2$. Since the adhesion force between the graphene current collector and the metal is known as about 0.7 $J/m^2$, the adhesion force mentioned above is enough for the metal layer to be easily removed from the electrode and the current collector. In addition, the adhesion force is high enough for the supercapacitor to have relatively high mechanical properties in the manufacturing, and thus the supercapacitor may have an increased life span and reliability.

Accordingly, the supercapacitor may be manufactured via the manufactured 1-1 unit stacked layer.

Here, the 1-1 unit stacked layer and a second separating layer 40 or an insulating layer, are alternately formed.

For example, the 1-1 unit stacked layer and the second separating layer 40 are alternately formed with each other one by one, or the 1-1 unit stacked layer and the insulting layer are alternately formed with each other one by one. Alternatively, the 1-1 unit stacked layer and the second separating layer are stacked, or the 1-1 unit stacked layer and the insulating layer are stacked, and then, as illustrated in FIGS. 3A and 3B, the stacked layers are folded like a wrinkle shape or a folded shape.

The number of the stacked layers of the 1-1 unit stacked layer in the supercapacitor may be decided based on the thickness required for the supercapacitor or the thickness of the current collector, the electrode and the separating layer. Further, series or parallel connections due to a voltage and a capacitor for the supercapacitor may be considered. Accordingly, the supercapacitor having relatively thinner thickness and higher capacitor may be manufactured.

Hereinafter, a method for manufacturing a supercapacitor according to still another example embodiment is explained in detail. This example embodiment may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. In addition, the same reference numerals will be used to refer to the same or like parts and any further repetitive explanation concerning the above elements will be omitted. Further, a unit for a material may be weight % if there is not any definition.

EXAMPLE 1

A first graphene current collector having a thickness of 10~15 nm is formed on both sides of a nickel layer having a thickness of 40 μm, in a 2-inch tube furnace, via the chemical vapor deposition (CVD).

Here, the annealing in which argon-hydrogen $(Ar/H_2)$ mixed gas having an amount of $(Ar/H_2=300$ sccm/100 sccm) is flowed to a nickel-copper layer, with a pressure of 300 mTorr and a temperature of 1020° C., during 45 min, is performed. Then, with the same conditions, the mixed gas of methane, hydrogen and argon mixed with 10 sccm:100 sccm:300 sccm, is flowed to synthesize a graphene. Then, a chamber is cooled until 800° C. by a speed of 2° C. per a min, and the chamber is open to be cooled to a room temperature.

Then, a first slurry is coated on a graphene current collector via a doctor-blade coating, to form a first electrode having a thickness of about 100 μm. Here, for forming the first slurry, activated carbon, a binder and a carbon black are mixed with a weight ratio of 8:1:1, and a solution of n-methyl-2-pyrrolidone (NMP) is used to provide proper viscosity for the coating, for example between about 10,000 cP and about 40,000 cP. The binder includes polytetrafluoroethylene (PTFE) and styrene butadiene rubber (SBR) with a weight ratio of 50:50.

Then, cellulose separating membrane (product by NKK co., Ltd.) is stacked on the first slurry, to form the first stacked layer.

With the same method, the copper layer, the graphene current collector and the second electrode are stacked to form a second stacked layer.

Then, the first stacked layer and the second stacked layer are stacked, to form a third stacked layer, and here, a separating layer of the first stacked layer makes contact with the second electrode of the second stacked layer.

Then, the third stacked layer is removed via a heat treatment with 210° C. during 2 hours, and the compressing is performed via a roll press process. Then, outmost two copper layers are detached or removed from the third stacked layer, to form a unit stacked layer. A separating layer is stacked on the second electrode of the unit stacked layer, and then the staked layers are rolled to have a jelly shape, to complete a supercapacitor.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The present invention is not limited to the embodiments explained detailed in the above specification, and includes all matters equivalent to or equal to the claimed invention or the invention modified those skilled in the art based on the claimed invention.

What is claimed is:

1. A method for manufacturing a supercapacitor, the method comprising:
    a) sequentially forming a first graphene current collector, a first electrode and a first separating layer on a first metal layer, to form a first stacked layer;
    b) sequentially forming a second graphene current collector and a second electrode on a second metal layer, to form a second stacked layer;
    c) forming the second electrode of the second stacked layer on the first separating layer of the first stacked layer, to form a third stacked layer;
    d) compressing the third stacked layer to remove the first and second metal layers, to form a unit stacked layer; and
    e) alternately forming the unit stacked layer and a second separating layer or an insulating layer.

2. The method of claim 1, wherein in step d), Equation 1 is satisfied, $$T_0 \times 0.3 \leq T \leq T_0 \times 0.5 \qquad \text{[Equation 1]}$$

wherein $T_0$ is a thickness of the third stacked layer before the compressing, T is a thickness of the third stacked layer after the compressing and before the removing of the first and second metal layers.

3. The method of claim 1, wherein after the compressing of step d), adhesion between the first graphene current collector and the first electrode, and adhesion between the second graphene current collector and the second electrode, are between about 10 $J/m^2$ and about 200 $J/m^2$, respectively.

4. The method of claim 1, wherein each of the first graphene current collector and the second graphene current collector is stacked with a thickness of between about 0.4 nm and about 1 μm.

5. The method of claim 4, wherein each of the first graphene current collector and the second graphene current collector is stacked via chemical vapor deposition.

6. A method for manufacturing a supercapacitor, the method comprising:
   A) sequentially forming a first graphene current collector, a first electrode and a first separating layer on a first metal layer, to form a first stacked layer;
   B) compressing the first stacked layer to remove the first metal layer, to form a 1-1 unit stacked layer; and
   C) alternately forming the 1-1 unit stacked layer and a second separating layer or an insulating layer.

\* \* \* \* \*